(12) United States Patent
Park et al.

(10) Patent No.: US 8,923,253 B2
(45) Date of Patent: Dec. 30, 2014

(54) METHODS FOR TRANSMITTING AND RECEIVING CHANNEL STATE INFORMATION (CSI) AND APPARATUSES THEREOF

(71) Applicant: LG Electronics Inc., Seoul (KR)

(72) Inventors: Hanjun Park, Anyang-si (KR);
Seungmin Lee, Anyang-si (KR);
Hyungtae Kim, Anyang-si (KR);
Hanbyul Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 94 days.

(21) Appl. No.: 13/653,125

(22) Filed: Oct. 16, 2012

(65) Prior Publication Data

US 2013/0094479 A1  Apr. 18, 2013

Related U.S. Application Data

(60) Provisional application No. 61/547,742, filed on Oct. 16, 2011.

(51) Int. Cl.
| | |
|---|---|
| *H04J 3/00* | (2006.01) |
| *H04L 1/00* | (2006.01) |
| *H04L 5/00* | (2006.01) |
| *H04W 72/04* | (2009.01) |
| *H04W 28/06* | (2009.01) |
| *H04W 72/12* | (2009.01) |

(52) U.S. Cl.
CPC ............ *H04L 1/0026* (2013.01); *H04L 1/0027* (2013.01); *H04L 5/0007* (2013.01); *H04W 72/0446* (2013.01); *H04W 28/06* (2013.01); *H04L 5/0035* (2013.01); *H04L 5/0057* (2013.01); *H04W 72/042* (2013.01); *H04L 1/0077* (2013.01); *H04L 1/0031* (2013.01); *H04W 72/1289* (2013.01); *H04W 72/0453* (2013.01)

USPC ........... 370/336; 370/252; 370/328; 370/329; 455/403; 455/422.1

(58) Field of Classification Search
CPC .............. H04W 72/04; H04W 72/042; H04W 72/0406; H04W 24/10
USPC ................. 370/241, 252, 310, 328, 329, 336; 455/403, 422.1
See application file for complete search history.

(56) References Cited

U.S. PATENT DOCUMENTS

2011/0242982 A1* 10/2011 Lunttila et al. ................ 370/241
2011/0319068 A1* 12/2011 Kim et al. ................... 455/422.1

* cited by examiner

*Primary Examiner* — Un C Cho
*Assistant Examiner* — Siming Liu
(74) *Attorney, Agent, or Firm* — McKenna Long & Aldridge LLP

(57) ABSTRACT

A method for transmitting, by a user equipment (UE), a channel state information (CSI) in a wireless communication system is disclosed. The method includes receiving control information about a transmission of the CSI from a serving eNodeB, allocating a CSI combination composed of different CSIs to one subframe based on the received control information, and transmitting the CSI combination to the serving eNodeB in the allocated subframe, wherein the control information includes information on a maximum payload size of a CSI being able to be transmitted in one subframe, a transmission period and a transmission start time point of the CSI combination, and a transmission period and a transmission start time point of each of the different CSIs.

18 Claims, 16 Drawing Sheets

METHODS FOR TRANSMITTING AND RECEIVING CHANNEL STATE INFORMATION (CSI) AND APPARATUSES THEREOF

This application claims the benefit of U.S. Patent Application No. 61/547,742, filed on Oct. 16, 2011, which is hereby incorporated by reference as if fully set forth herein.

BACKGROUND OF THE INVENTION

1. Field of the Invention

The present invention relates to transmitting channel state information (CSI), and more particularly, to a method and apparatus for transmitting channel state information on a plurality of transmission points in the downlink of a multiple cell wireless communication system.

2. Discussion of the Related Art

Various devices such as smart phones, tablet PCs, tec., which require machine-to-machine communication and the large amount of data transmission, and such technologies are being introduced and distributed. As such, the amount of data required to be processed in the cellular network is rapidly increasing. Likewise, in order to satisfy the requirement on the amount of data to be processed which is on a rapid increase, a carrier aggregation technology, a cognitive radio technology, etc. for efficiently utilizing more frequency bands, and a multiple antenna technology, a multiple base station cooperation technology, etc. for increasing the data capacity transmitted within the limited frequency, are being developed.

Among such technologies, a coordinated multiple point transmission and reception (CoMP) scheme has been suggested for improvement of performance of a wireless communication system. It is expected that the CoMP scheme would improve the performance of a user equipment (UE) located in the cell boundary, and improve the average sector throughput. However, even if the CoMP scheme is applied, there is still an inter-cell interference (ICI) which reduces performance of the UE located in the cell boundary, and this leads to an issue on channel assumption of a UE which is provided communication services through the CoMP scheme.

SUMMARY OF THE INVENTION

An object of the present invention is to provide a transmission structure for transmitting channel state information (CSI) on transmission points (TPs) which participate in a coordinated multiple point transmission (CoMP) scheme within limited time-frequency resources.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for transmitting, by a user equipment (UE), a channel state information (CSI) in a wireless communication system includes receiving control information about a transmission of the CSI from a serving eNodeB, allocating a CSI combination comprised of different CSIs to one subframe on the basis of the received control information, and transmitting the CSI combination to the serving eNodeB in the allocated subframe, wherein the control information includes information on a maximum payload size of a CSI being able to be transmitted in one subframe, a transmission period and a transmission start time point of the CSI combination, and a transmission period and a transmission start time point of each of the different CSIs.

Preferably, the transmission period of the CSI combination or each of the different CSIs is set to a multiple of a predetermined unit transmission period.

Preferably, the allocating further includes allocating an additional CSI to the subframe to which the CSI combination has been allocated, wherein the additional CSI includes a CSI between eNodeBs which perform downlink transmission to the UE.

Preferably, the CSI combination comprises at least two different CSIs.

Preferably, when at least two CSI combinations are allocated to the one subframe and collide with each other, the transmitting includes transmitting one CSI combination selected from the at least two CSI combinations.

Preferably, the selection is determined according to a priority and the priority is given to each of the CSI combinations or each of the different CSIs in the CSI combinations.

In another aspect of the present invention, a user equipment (UE) for transmitting a channel state information (CSI) in a wireless communication system includes a radio frequency (RF) unit for transmitting or receiving a radio signal, and a processor for controlling the RF unit, wherein the processor controls the RF unit to receive control information about a transmission of the CSI from the serving eNodeB, allocates a CSI combination comprised of different CSIs to one subframe based on the received control information, and controls the RF unit to transmit the CSI combination to the serving eNodeB in the allocated subframe, wherein the control information includes information on a maximum payload size of a CSI being able to be transmitted in one subframe, a transmission period and a transmission start time point of the CSI combination, and a transmission period and a transmission start time point of each of the different CSIs.

Preferably, the transmission period of the CSI combination or each of the different CSIs is set to a multiple of a predetermined unit transmission period.

Preferably, the processor allocates an additional CSI to a subframe to which the CSI combination has been allocated, wherein the additional CSI includes a CSI between eNodeBs that perform downlink transmission to the UE.

Preferably, the processor allocates a CSI combination comprised of at least two different CSIs to the subframe.

Preferably, when at least two CSI combinations are allocated the one subframe and collide with each other, the processor controls the RF unit to transmit one CSI combination selected from the at least two CSI combinations.

Preferably, the selection is determined according to a priority, and the priority is given to each of the CSI combinations or each of the different CSIs in the CSI combinations.

In another aspect of the present invention, a method for receiving, by an eNodeB, a channel state information (CSI) in a wireless communication system includes transmitting control information on transmission of the CSI to a user equipment (UE), and receiving a CSI combination, from the UE, in a subframe to which the CSI combination has been allocated based on the control information, wherein the CSI combination comprises different CSIs, and wherein the control information includes information on a maximum payload size of a CSI being able to be transmitted in one subframe, a transmission period and a transmission start time point of the CSI combination, and a transmission period and a transmission start time point of each of the different CSIs.

Preferably, the transmission period of the CSI combination or each of the different CSIs is set to a multiple of a predetermined unit transmission period.

Preferably, the CSI combination comprises at least two different CSIs.

In another aspect of the present invention, an eNodeB for receiving a channel state information (CSI) in a wireless communication system includes a radio frequency unit for transmitting and receiving a radio signal, and a processor for controlling the RF unit, wherein the processor controls the RF unit to transmit control information on transmission of the CSI to a user equipment (UE) and to receive the CSI combination from the UE in a subframe to which the CSI combination has been allocated based on the control information, wherein the CSI combination comprises different CSIs, wherein the control information includes information on a maximum payload size of a CSI being able to be transmitted in one subframe, a transmission period and a transmission start time point of the CSI combination, and a transmission period and a transmission start time point of each of the different CSIs.

Preferably, the transmission period of the CSI combination or each of the different CSIs is set to a multiple of a predetermined unit transmission period.

Preferably, the CSI combination comprises at least two different CSIs.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
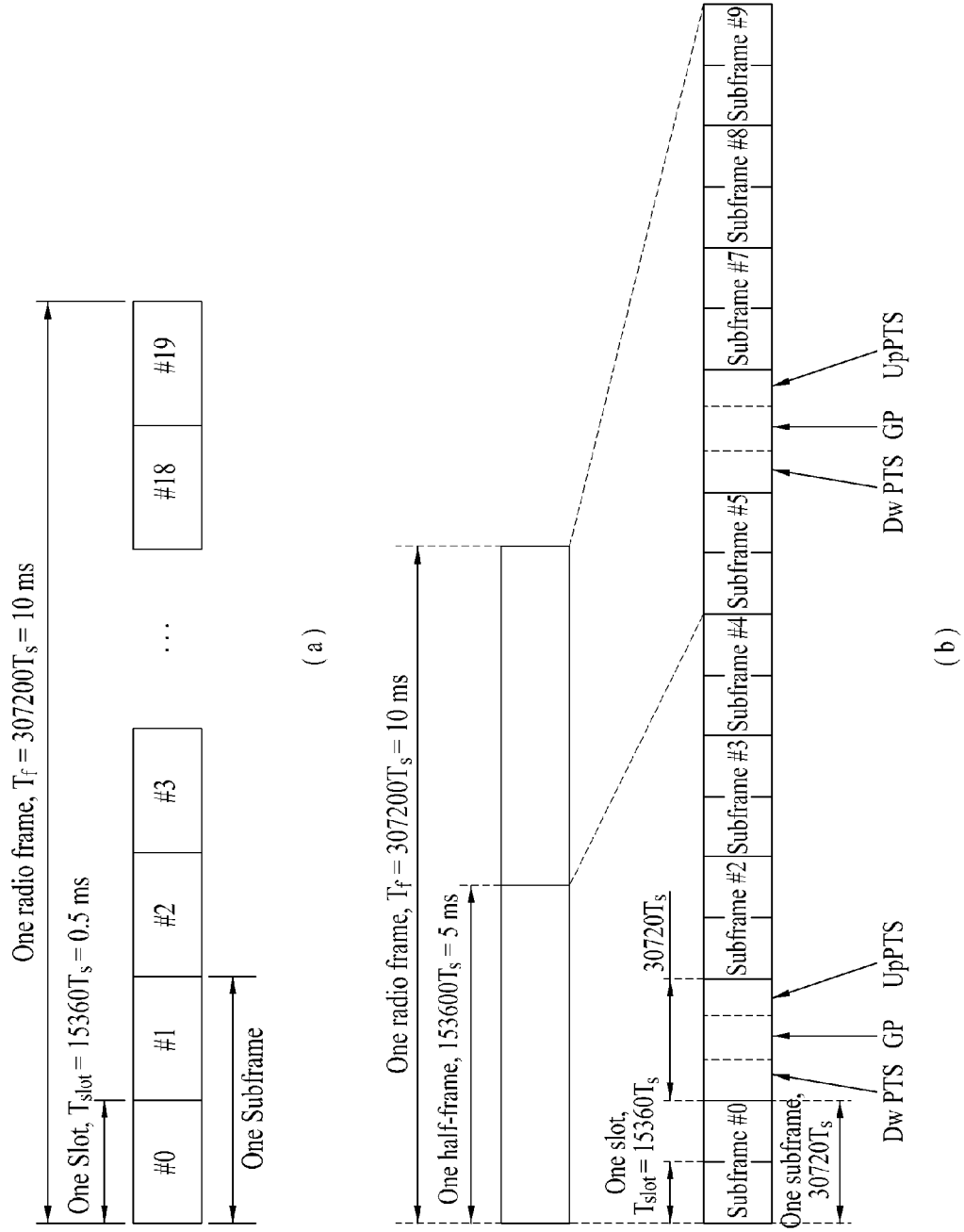
FIG. 1 is a diagram showing an example of a radio frame structure used in a wireless communication system.

Reference will now be made in detail to the preferred embodiments of the present invention, examples of which are illustrated in the accompanying drawings. The detailed description set forth below in connection with the appended drawings is intended as a description of exemplary embodiments and is not intended to represent the only embodiments in which the concepts explained in these embodiments can be practiced. The detailed description includes details for the purpose of providing an understanding of the present invention. However, it will be apparent to those skilled in the art that these teachings may be implemented and practiced without these specific details.

The following technique, apparatus and system is applicable to various wireless multiple access systems. For convenience of description, assume that the present invention is applied to 3GPP LTE(-A). However, the technical features of the present invention are not limited thereto. For example, although the following detailed description is made in detail on the assumption that a mobile communication system is a 3GPP LTE(-A) system, it is applicable to other prescribed mobile communication systems by excluding unique items of the 3GPP LTE(-A) system.

In some instances, well-known structures and devices are omitted in order to avoid obscuring the concepts of the present invention and the important functions of the structures and devices are shown in block diagram form. The same reference numbers will be used throughout the drawings to refer to the same or like parts.

In the present invention, a user equipment (UE) may be fixed or mobile and include various apparatuses which communicate with a base station (BS) and transmit and receive user data and/or a variety of control information. The UE may be referred to as a terminal Equipment, a mobile station (MS), a mobile terminal (MT), a user terminal (UT), a subscriber station (SS), a wireless device, a personal digital assistant (PDA), a wireless modem, a handheld device, etc. In the present invention, a base station (BS) refers to a fixed station which communicates with a UE and/or another BS and exchanges a variety of data and control information. The BS is referred to as an advanced base station (ABS), a node-B (NB), an evolved-NodeB (eNB), a base transceiver system (BTS), an access point (AP), a processing server (PS), etc.

In the present invention, a PDCCH (Physical Downlink Control CHannel)/PCFICH (Physical Control Format Indicator CHannel)/PHICH (Physical Hybrid automatic retransmit request Indicator CHannel)/PDSCH (Physical Downlink Shared CHannel) refers to a set of resource elements or a set of time-frequency resources carrying DCI (Downlink Control Information)/CFI (Control Format Indicator)/downlink ACK/NACK (ACKnowlegement/Negative ACK)/downlink data. In addition, a PUCCH (Physical Uplink Control CHannel)/PUSCH (Physical Uplink Shared CHannel) refers to a set of resource elements or a set of time-frequency resources carrying UCI (Uplink Control Information)/uplink data. In the present invention, in particular, time-frequency resources or resource elements (REs) allocated to or belonging to PDCCH/PCFICH/PHICH/PDSCH/PUCCH/PUSCH are referred to as PDCCH/PCFICH/PHICH/PDSCH/PUCCH/PUSCH REs or PDCCH/PCFICH/PHICH/PDSCH/PUCCH/PUSCH resources. Accordingly, in the present invention, transmission of a PUCCH/PUSCH by a UE means that an uplink control information/uplink data/random access signal is transmitted on a PUCCH/PUSCH. In the present invention, transmission of a PDCCH/PCFICH/PHICH/PDSCH by a BS means that downlink data/control information is transmitted on a PDCCH/PCFICH/PHICH/PDSCH.

In addition, in the present invention, a CRS (Cell-specific Reference Signal)/DMRS (Demodulation Reference Signal)/CSI-RS (Channel State Information Reference Signal) time-frequency resources (or REs) refer to time-frequency resources (or REs) carrying CRS/DMRS/CSI-RS, REs allocated to CRS/DMRS/CSI-RS or available REs. A subcarrier including a CRS/DMRS/CSI-RS RE is referred to as a CRS/DMRS/CSI-RS subcarrier and an OFDM symbol including a CRS/DMRS/CSI-RS RE is referred to as a CRS/DMRS/CSI-RS symbol. In addition, in the present invention, SRS time-frequency resources (or REs) refer to time-frequency resources (or REs) transmitted from a UE to a BS to carry a sounding reference signal (SRS) used for measurement of an uplink channel state formed between the UE and the BS. A reference signal (RS) refers to a predefined signal known to a UE and a BS and having a special waveform and is referred to as a pilot signal.

Meanwhile, in the present invention, a cell refers to a predetermined geographical region in which a BS, node(s) or antenna port(s) provide a communication service. Accordingly, in the present invention, communication with a specific cell may refer to communication with a BS, node or antenna port for providing a communication service to the specific cell. In addition, a downlink/uplink signal of a specific cell refers to a downlink/uplink signal from/to a BS, node or antenna port for providing a communication service to the specific cell. In addition, channel state/quality of a specific cell refers to channel state/quality of a channel or communication link formed between a UE and a BS, node or antenna port for providing a communication service to the specific cell.

FIG. 1 is a diagram showing the structure of a radio frame used in a wireless communication system. In particular, FIG. 1(a) shows a radio frame structure used in frequency division duplex (FDD) in 3GPP LTE(-A) and FIG. 1(b) shows a radio frame structure used in time division duplex (TDD) in 3GPP LTE(-A).

Referring to FIG. 1, a radio frame used in 3GPP LTE(-A) has a length of 10 ms ($307200 \cdot T_s$) and includes 10 subframes with the same size. The 10 subframes of the radio frame may be numbered. $T_s$ denotes sampling time, and is represented by $T_s = 1/(2048*15 \text{ kHz})$. Each of the subframes has a length of 1 ms and includes two slots. The 20 slots of one radio frame may be sequentially numbered from 0 to 19. Each of the slots has a length of 0.5 ms. A time for transmitting one subframe is defined as a transmission time interval (TTI). Time resources may be divided by a radio frame number (or a radio frame index), a subframe number (or a subframe index), a slot number (or a slot index), etc.

The radio frame may be differently configured according to duplex mode. For example, in an FDD mode, since downlink (DL) transmission and uplink (UL) transmission are divided according to frequency, a radio frame includes only one of a DL subframe or a UL subframe in a predetermined frequency band of a predetermined carrier frequency. In a TDD mode, since downlink (DL) transmission and uplink (UL) transmission are divided according to time, a radio frame includes both a DL subframe and a UL subframe in a predetermined frequency band of a predetermined carrier frequency.

Table 1 shows a DL-UL configuration of subframes within a radio frame, in a TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe and S denotes a special subframe. The special subframe includes three fields of DwPTS (Downlink Pilot TimeSlot), GP (Guard Period) and UpPTS (Uplink Pilot TimeSlot). DwPTS is a time slot reserved for DL transmission and UpPTS is a time slot reserved for UL transmission.

Figure 2:
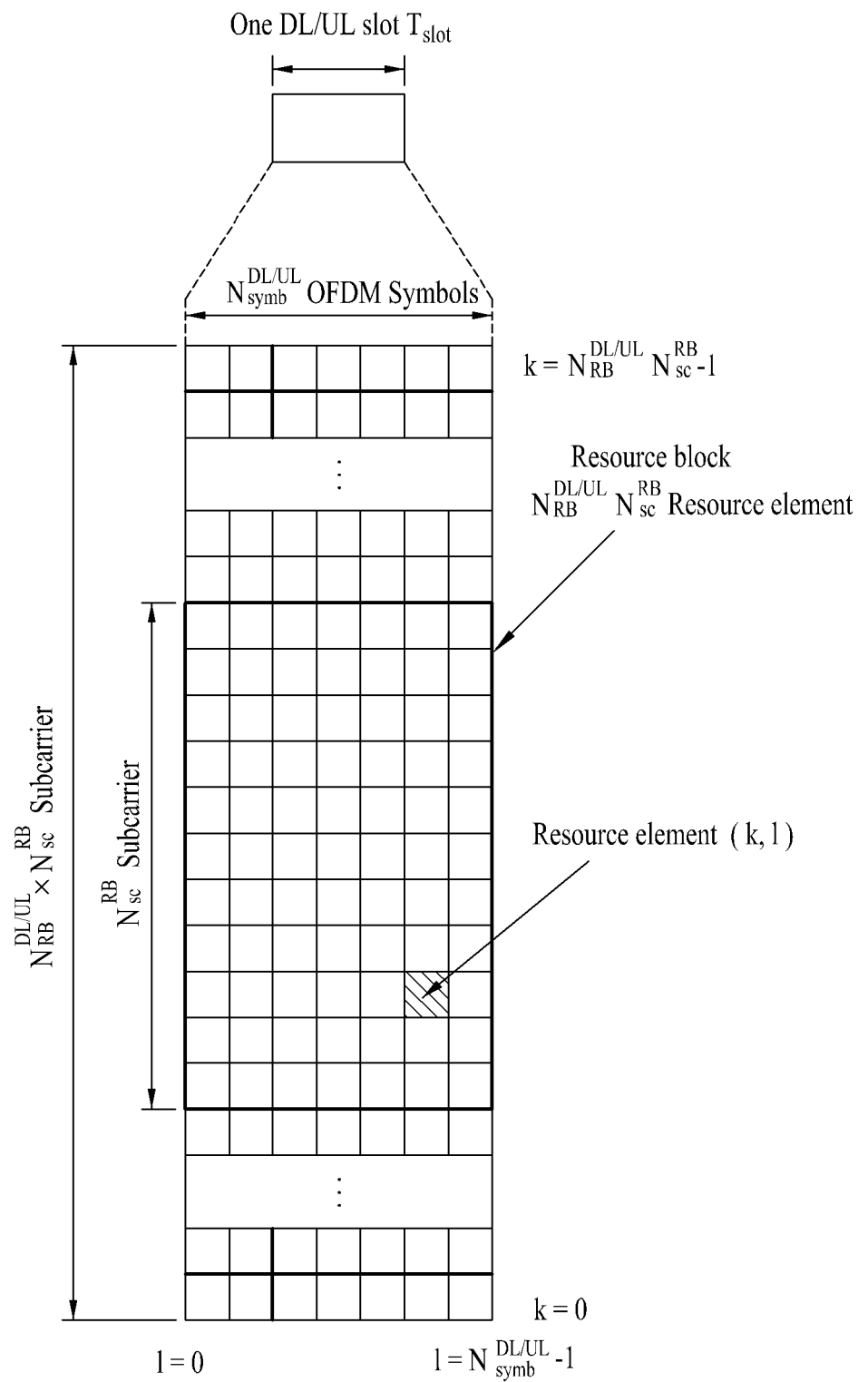
FIG. 2 is a diagram showing an example of a downlink/uplink (DL/UL) slot structure in a wireless communication system.

FIG. 2 is a diagram showing an example of a downlink/uplink (DL/UL) slot structure in a wireless communication system. In particular, FIG. 2 shows the structure of a resource grid of a 3GPP LTE(-A) system. One resource grid exists per antenna port.

A slot includes a plurality of orthogonal frequency division multiplexing (OFDM) symbols in a time domain and includes a plurality of resource blocks (RBs) in a frequency domain. The OFDM symbol means one symbol slot. Referring to FIG. 2, a signal transmitted in each slot may be expressed by a resource grid including $N^{DL/UL}_{RB} * N^{RB}_{sc}$ subcarriers and $N^{DL/UL}_{symb}$ OFDM symbols. $N^{DL}_{RB}$ denotes the number of resource blocks (RBs) in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, an SC-FDM symbol, etc. according to multiple access scheme. The number of OFDM symbols included in one slot may be variously changed according to channel bandwidth and CP length. For example, in a normal cyclic prefix (CP) case, one slot includes seven OFDM symbols. In an extended CP case, one slot includes six OFDM symbols. Although one slot of a subframe including seven OFDM symbols is shown in FIG. 2 for convenience of description, the embodiments of the present invention are similarly applicable to subframes having a different number of OFDM symbols. Referring to FIG. 2, each OFDM symbol includes $N^{DL/UL}_{RB} * N^{RB}_{sc}$ subcarriers in a frequency domain. The type of the subcarrier may be divided into a data subcarrier for data transmission, a reference signal subcarrier for reference signal transmission and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency.

One RB is defined as $N^{DL/UL}_{symb}$ (e.g., 7) consecutive OFDM symbols in a time domain and defined as $N^{RB}_{sc}$ (e.g., 12) consecutive subcarriers in a frequency domain. For reference, resource including one OFDM symbol and one subcarrier is referred to a resource element (RE) or tone. Accordingly, one RB includes $N^{DL/UL}_{symb} * N^{RB}_{sc}$ REs. Each RE within a resource grid may be uniquely defined by an index pair (k, l) within one slot. k is an index applied from 0 to $N^{DL/UL}_{RB} * N^{RB}_{sc} - 1$ in a frequency domain, and l is an index from 0 to $N^{DL/UL}_{symb} - 1$ in a time domain.

In one subframe, two RBs respectively located in two slots of the subframe while occupying the same $N^{RB}_{sc}$ consecutive subcarriers is referred to as a physical resource block (PRB) pair. Two RBs configuring a PRB pair have the same PRB number (or the same PRB index). A VRB is a logical resource allocation unit introduced for resource allocation. The VRB has the same size as the PRB. The VRB is classified into a localized VRB and a distributed VRB according to the method of mapping the PRB to the VRB. Localized VRBs are directly mapped to PRBs and thus VRB number (VRB index) directly corresponds to PRB number. That is, $n_{PRB} = n_{VRB}$. The localized VRBs are numbered from 0 to $N^{DL}_{VRB} - 1$ and $N^{DL}_{VRB} = N^{DL}_{RB}$. Accordingly, according to the localized mapping method, VRBs having the same VRB number are mapped to RRBs having the same PRB number in a first slot and a second slot. In contrast, the distributed VRB is mapped to the PRB through interleaving. Accordingly, the distributed VRBs having the same VRB number may be mapped to RRBs having different PRB numbers in a first slot and a second slot. Two PRBs which are respectively located in two slots of a subframe and have the same VRB number are referred to as a VRB pair.

Figure 3:
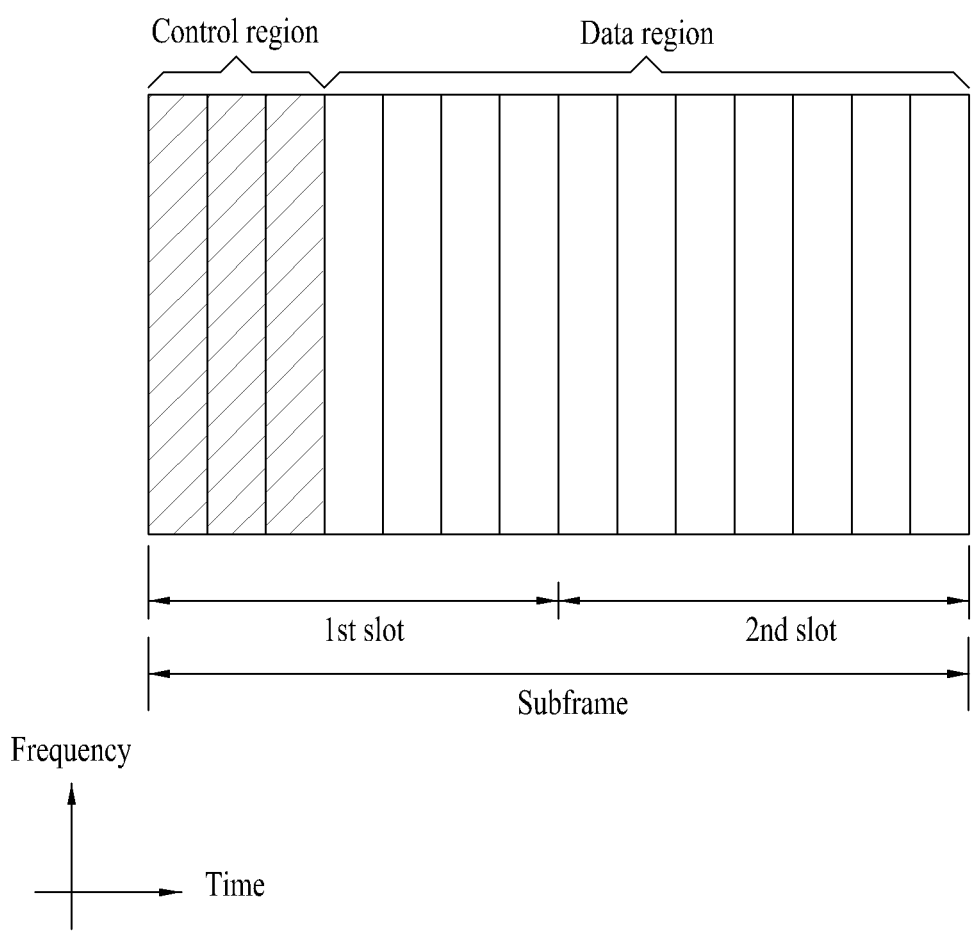
FIG. 3 is a diagram showing a downlink subframe structure used in a 3GPP LTE(-A) system.

FIG. 3 is a diagram showing a downlink subframe structure used in a 3GPP LTE(-A) system.

A DL subframe is divided into a control region and a data region in a time domain. Referring to FIG. 3, a maximum of 3 (or 4) OFDM symbols located in a front part of a first slot of a subframe correspond to the control region. Hereinafter, a resource region for PDCCH transmission in a DL subframe is referred to as a PDCCH region. OFDM symbols other than the OFDM symbols used in the control region correspond to the data region to which a physical downlink shared channel (PDSCH) is allocated. Hereinafter, a resource region available for PDSCH transmission in a DL subframe is referred to as a PDSCH region. Examples of a DL control channel used in 3GPP LTE include PCFICH (Physical Control Format Indicator Channel), PDCCH (Physical Downlink Control Channel), PHICH (Physical hybrid ARQ indicator Channel), etc. The PCFICH is transmitted in a first OFDM symbol of a subframe and carries information about the number of OFDM symbols used for transmission of a control channel within a subframe. The PHICH carries a HARQ ACK/NACK (acknowledgment/negative-acknowledgment) as a response to UL transmission.

Control transmitted via a PDCCH is referred to as downlink control information (DCI). The DCI includes resource allocation information of a UE or a UE group and other control information. For example, the DCI includes transmission format and resource allocation information of a DL shared channel (DL-SCH), transmission format and resource allocation information of a UL shared channel (UL-SCH), paging information on a paging channel (PCH), system information on a DL-SCH, resource allocation information of a higher-layer control message such as a random access response transmitted on a PDSCH, a Tx power control command set of individual UEs in a UE group, a Tx power control command, activation indication information of voice over IP (VoIP), etc. The size and usage of the DCI carried by one PDCCH may be changed according to DCI format and the size of the DCI may be changed according to coding rate.

A plurality of PDCCHs may be transmitted in a PDCCH region of a DL subframe. A UE may monitor a plurality of PDCCHs. A BS decides a DCI format according to DCI to be transmitted to a UE and attaches a cyclic redundancy check (CRC) to the DCI. The CRC is masked with an identifier (e.g., a Radio Network Temporary Identifier (RNTI)) according to an owner or usage of the PDCCH. If the PDCCH is for a specific terminal, a cell-RNTI (C-RNTI) of the terminal may be masked to the CRC. Alternatively, if the PDCCH is for a paging message, a paging indicator identifier (P-RNTI) may be masked to the CRC. If the PDCCH is for system information (more specifically, a system information block (SIB)), a system information identifier and a system information RNTI (SI-RNTI) may be masked to the CRC. If the PDCCH is for a random access response, a random access-RNTI (RA-RNTI) may be masked to the CRC. CRC masking (or scrambling) includes an XOR operation of a CRC and an RNTI at a bit level, for example.

A PDCCH is transmitted on one control channel element (CCE) or an aggregate of a plurality of consecutive CCEs. The CCE is a logical allocation unit used to provide a coding rate to a PDCCH based on a radio channel state. The CCE corresponds to a plurality of resource element groups (REGs). For example, one CCE corresponds to nine REGs and one REG corresponds to four REs. Four QPSK symbols are mapped to each REG. An RE occupied by an RS is not included in an REG. Accordingly, the number of REGs within a given OFDM symbol is changed according to presence/absence of an RS. The REG concept is also used for other DL control channels (that is, a PCFICH and a PHICH). A DCI format and the number of DCI bits are determined according to the number of CCEs.

CCEs are numbered and consecutively used and, in order to simplify decoding, a PDCCH having a format composed of n CCEs may start from only a CCE having a number corresponding to a multiple of n. The number of CCEs used to transmit a specific PDCCH, that is, a CCE aggregation level, is determined by a BS according to a channel state. For example, in case of a PDCCH for a UE having a good DL channel (e.g., a UE adjacent to a BS), one CCE may be sufficient. However, in case of a PDCCH for a UE having a bad channel (e.g., a UE located at a cell edge), 8 CCEs are required to obtain sufficient robustness.

Figure 4:
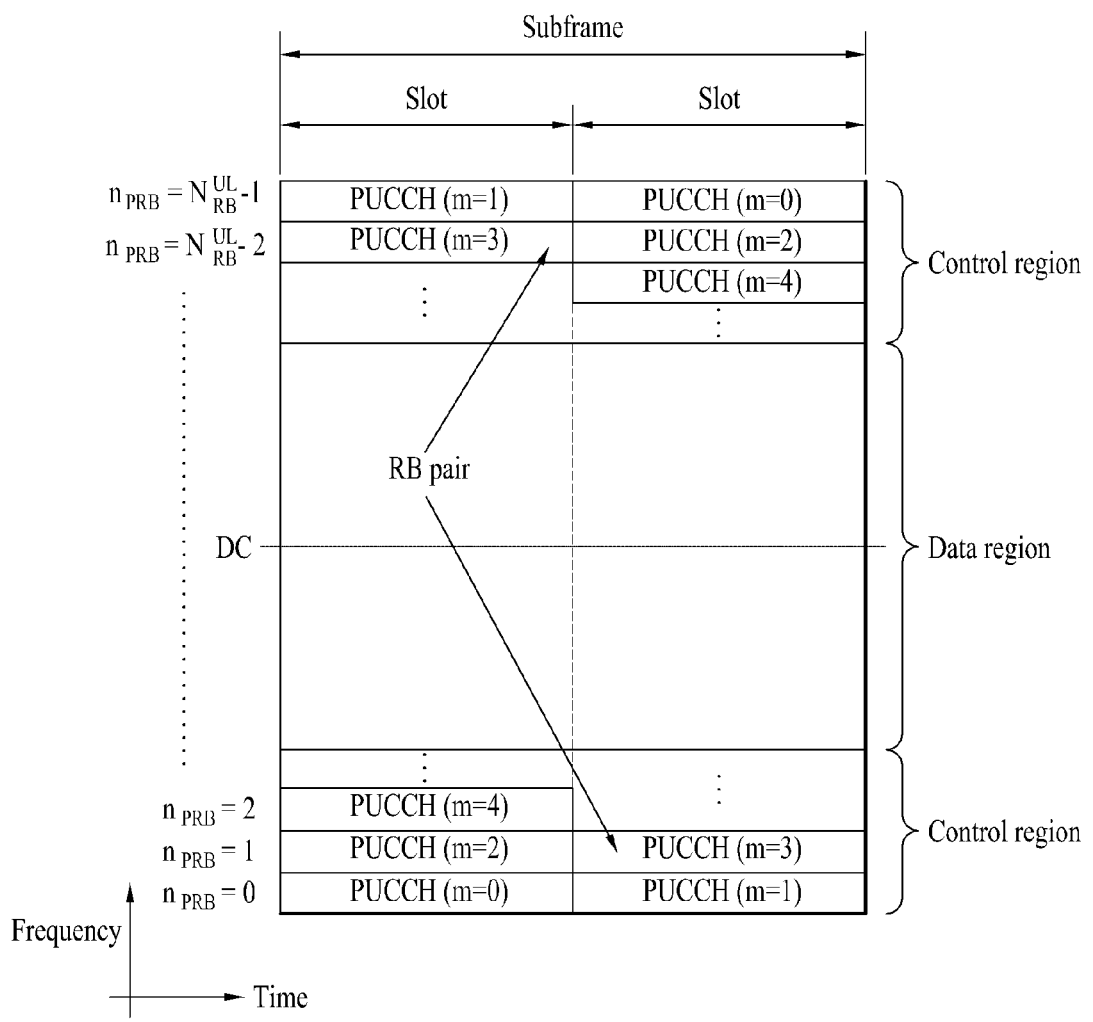
FIG. 4 is a diagram showing an example of an uplink subframe structure used in a 3GPP LTE(-A) system.

FIG. 4 is a diagram showing an example of an uplink subframe structure used in a 3GPP LTE(-A) system.

Referring to FIG. 4, a UL subframe may be divided into a control region and a data region in a frequency domain. One or several physical uplink control channels (PUCCHs) may be allocated to the control region in order to carry uplink control information (UCI). One or several physical uplink shared channels (PUSCHs) may be allocated to the data region of the UL subframe in order to carry user data. The control region and the data region in the UL subframe are also referred to as a PUCCH region and a PUSCH region, respectively. A sounding reference signal (SRS) may be allocated to the data region. The SRS is transmitted on a last OFDM symbol of a UL subframe in a time domain and is transmitted on a data transmission band, that is, a data region, of the UL subframe. SRSs of several UEs, which are transmitted/received on the last OFDM symbol of the same subframe, are distinguished according to frequency location/sequence.

If a UE employs an SC-FDMA scheme in UL transmission, in order to maintain a single carrier property, in a 3GPP LTE release-8 or release-9 system, a PUCCH and a PUSCH may not be simultaneously transmitted on one carrier. In a 3GPP LTE release-10 system, support of simultaneous transmission of a PUCCH and a PUSCH may be indicated by a higher layer.

In a UL subframe, subcarriers distant from a direct current (DC) subcarrier are used as the control region. In other words, subcarriers located at both ends of a UL transmission bandwidth are used to transmit uplink control information. A DC subcarrier is a component which is not used to transmit a signal and is mapped to a carrier frequency $f_0$ in a frequency up-conversion process. A PUCCH for one UE is allocated to an RB pair belonging to resources operating in one carrier frequency and RBs belonging to the RB pair occupy different subcarriers in two slots. The allocated PUCCH is expressed by frequency hopping of the RB pair allocated to the PUCCH at a slot boundary. If frequency hopping is not applied, the RB pair occupies the same subcarrier.

The size and usage of UCI carried by one PUCCH may be changed according to PUCCH format and the size of the UCI may be changed according to a coding rate. For example, the following PUCCH format may be defined.

TABLE 2

| PUCCH format | Modulation scheme | Number of bits per subframe | Usage | Etc. |
|---|---|---|---|---|
| 1 | N/A | N/A (exist or absent) | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 2, PUCCH format 1 series and PUCCH format 3 series are used to transmit ACK/NACK information and PUCCH format 2 series are mainly used to carry channel state information such as CQI (channel quality indicator)/PMI (precoding matrix index)/RI (rank index).

Figure 5:
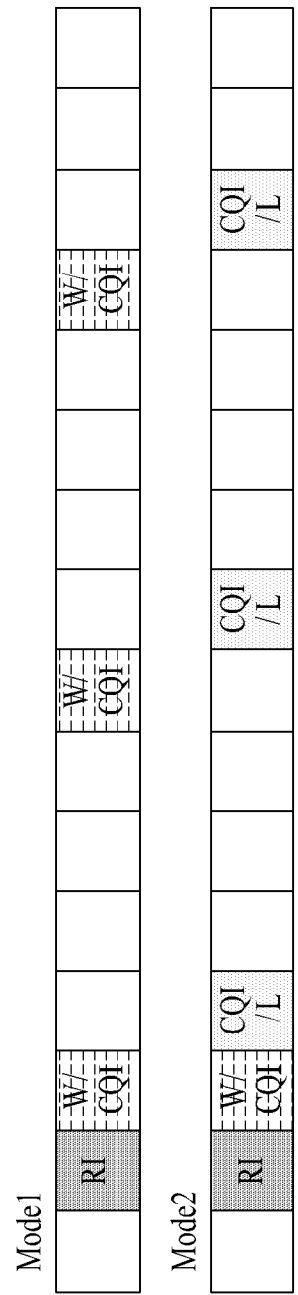
FIG. 5 a diagram showing a PUCCH-based periodic CSI transmission structure defined in LTE release 8.

FIG. 5 illustrates a PUCCH-based periodic channel state information (CSI) transmission structure defined in LTE release 8. In FIG. 5, the mode 1-CSI transmission structure indicates a case in which wideband PMI and CQI are transmitted along with RI, and the mode 2-CSI structure indicates a case in which wideband PMI and CQI, and sub-band CQI are transmitted along with the RI.

Figure 6:
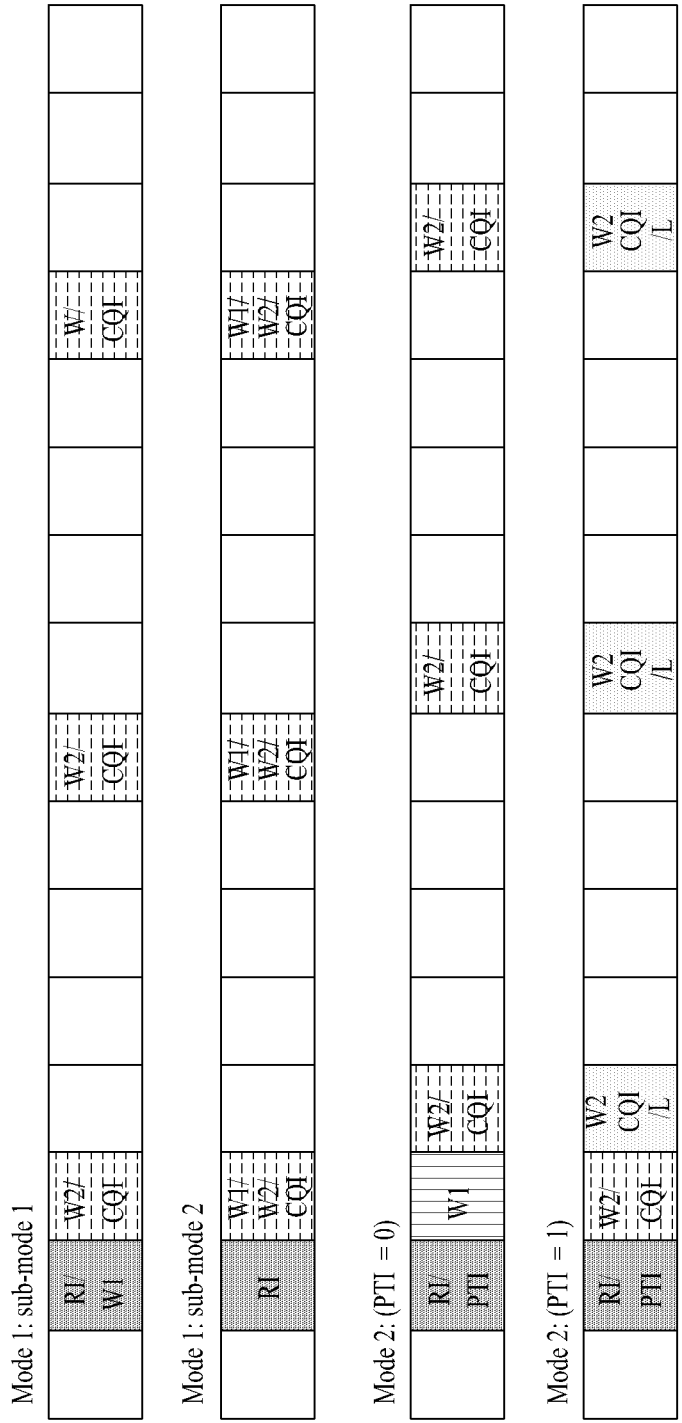
FIG. 6 is a diagram showing a PUCCH-based periodic CSI transmission structure additionally defined in LTE release 10.

FIG. 6 illustrates a PUCCH-based periodic CSI transmission structure additionally defined in LTE release 10. In LTE release 10, the CSI transmission structure may support transmitting antennas up to 8 transmitting antennas. Here, the PMI has been changed into the first PMI (1st PMI) for the average channel direction and the second PMI (2nd PMI) for the instantaneous channel direction, and the precoding type indicator (PTI) for whether to transmit the sub-band channel information has been added.

The first, second and third CSI transmission structures of FIG. 6 indicate a case of transmitting a wideband CSI, and are distinguished in that, among wideband CSIs, the 1st PMI may be transmitted along with the RI, may be transmitted along with the CQI, or may be transmitted through other resources. The last transmission structure indicates a case in which the subband CSI is transmitted.

Figure 7:
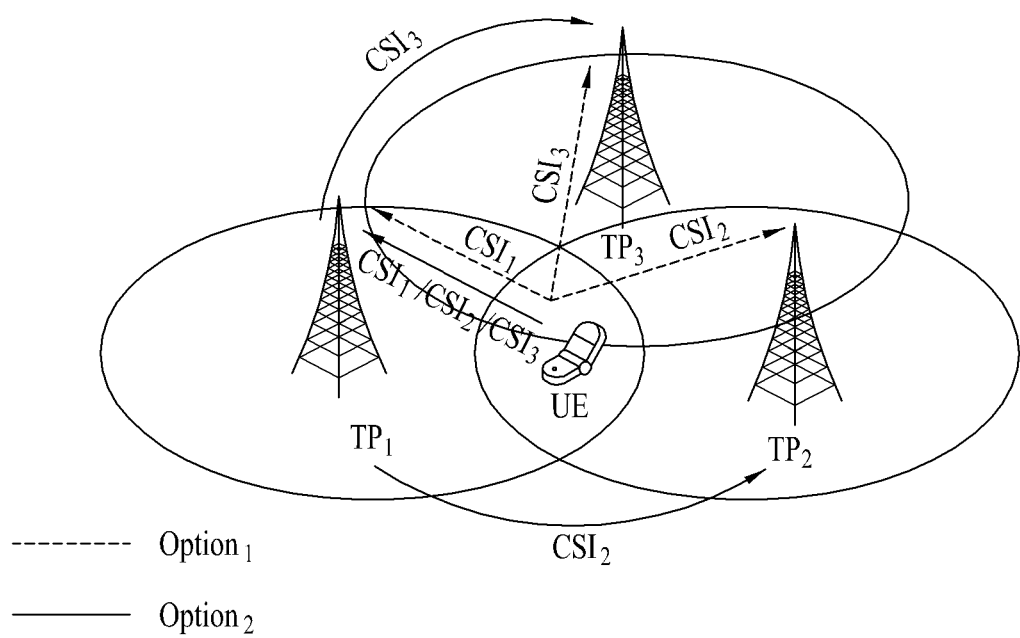
FIG. 7 is a diagram briefly showing a feedback operation of channel state information (CSI) in a wireless communication system which supports a CoMP scheme.

FIG. 7 briefly illustrates a feedback operation of channel state information in a wireless communication system which supports a CoMP scheme.

The present invention suggests a multiple CSI transmission structure for reflecting each of characteristic of channels between a UE and transmission points (TPs) and transmitting multiple CSIs through the extended container when CSI for part or all of the TPs within the coordinated multiple point transmission and reception (COMP) group is required in the downlink of the multiple cell wireless communication system.

In the present specification, a container may generally refer to time-frequency resources for transmitting the CSI. As another example, the container may refer to a PUCCH for transmitting for the CSI. As further another example, the container may refer to a PUSCH for transmitting the CSI. Further, an extended container is a combination of at least two of the containers, and is the extended concept of time-frequency resources in the time-frequency resources for the existing general CSI transmission. For example, if one CSI (i.e., any one of CQI, PMI, PTI and RI) has been transmitted through the one container before, at least two CSIs may be simultaneously transmitted through the extended container.

Hereinafter, in the present specification, the exemplary embodiments of the present invention will be explained based on the container and the extended container, but as explained above, the container and the extended container may also refer to time-frequency resources, PUCCH or PUSCH, etc.

Further, referring to the PUCCH format of Table 2 above, for example, the concept of the container and the extended container will be described. If each of the PUCCH formats (1, 1a, 1b, 2, 2a, 2b, 3) corresponds to the container, at least two combinations of each PUCCH format may correspond to the extended container.

Further, the combination of at least two time-frequency resource structures for such an individual CSI transmission is called a multiple CSI transmission structure.

A large number of TPs as well as three TPs ($TP_1$, $TP_2$, $TP_3$) illustrated in FIG. 7 of the present specification may participate in the CoMP operation, and a group of the coordinated multiple transmission and reception (CoMP) including a plurality of TPs is called a CoMP set. Part or all of the TPs, which belong to the CoMP set, may participate in the CoMP on the UE according to the channel state. Here, each TP may include a plurality of antenna ports. Further, as described above, in the present specification, the TP may be indicated compatible with the BS.

In a wireless communication system such as 3GPP LTE, etc., the CSI transmission structure is supported to improve downlink system performance. For example, the CSI of LTE release 8 includes channel information such as the rank indicator (RI), channel quality information (CQI), the precoding matrix indicator (PMI), etc., and supports two or four transmitting antennas. Here, the RI is transmitted in a sub-frame which is distinguished from that of CQI and the PMI, and the CQI and PMI are configured as values selected under the assumption of the RI. The CSI may be periodically or non-periodically transmitted.

In the CoMP group comprised of a plurality of TPs, a plurality of channels exist between the TPs and UEs, and the CSI on part or all of the channels may be utilized in the CoMP scheme. Hence, the CSI for the CoMP set should be able to include a single set of or a plurality of sets of channel information. The method of transmitting CSI on the CoMP set may exist in various forms. For example, if there is an individual uplink channel for CSI transmission between UEs and each of the TPs, the CSI for each TP may be directly transmitted through the individual uplink channel. However, individual CSI transmission for each TP may become impossible, and in such a case, multiple CSIs may be transmitted to TPs corresponding to each CSI through the backhaul network after transmitted to a specific TP. FIG. 7 shows a case (option 1) in which, in a CoMP set comprised of $TP_1$, $TP_2$ and $TP_3$, if the UE transmits the CSI for each of TPs using an individual channel, and a case (option 2) in which the UE transmits all CSIs to a specific TP (i.e., $TP_1$), and then the TP transmits the CSI for each TP (i.e., $TP_2$, $TP_3$) to each TP through the backhaul network.

Among the above suggested CSI transmission methods, option 1 may be applied without separately changing the existing single CSI transmission structure when transmitting the CSI to each TP, but in the case of option 2, a multiple CSI transmission structure in which the UE can transmit a plurality of CSIs to a specific TP. Here, the extended CSI container may be considered in the multiple CSI transmission structure, and for example, PUCCH format 3 suggested in LTE release 10 may be utilized. Here, the extended CSI container-based multiple CSI transmission structure should be able to reflect the CSI transmission structure which is suitable for each CSI. Different CSI transmission structures may be applied to each CSI according to the channel environment. For example, in FIG. 7, the CSI transmission structure of FIG. 5, which supports four transmitting antennas, may be appropriate for $TP_1$ and $TP_2$, but the CSI transmission structure of FIG. 6, which supports 8 transmitting antennas, may be appropriate for $TP_3$. Hence, the multiple CSI transmission structure should be designed to reflect the CSI transmission structure, which is appropriate for each CSI, as much as possible, by utilizing the extended CSI container.

Figure 8:
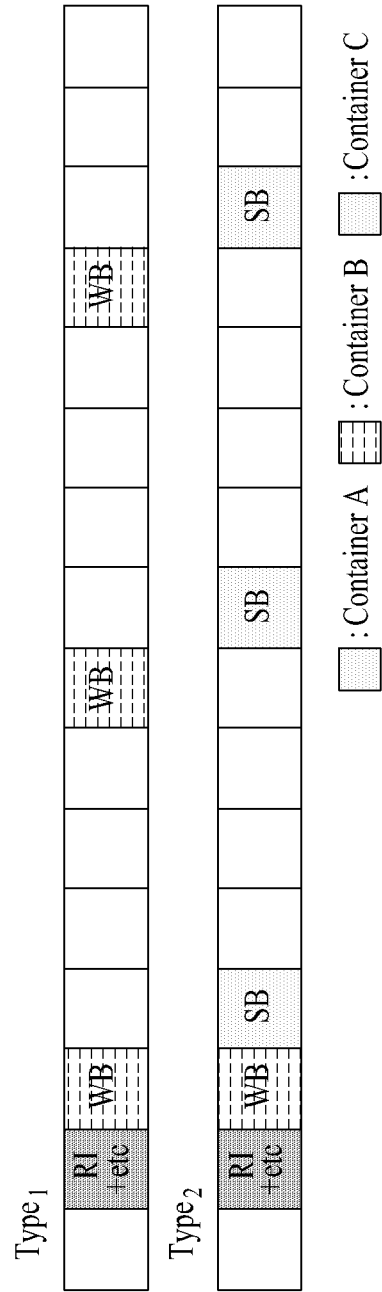
FIG. 8 is a diagram showing an example of a single CSI transmission structure.

FIG. 8 illustrates an example of the entire CSI transmission structure. Among PUCCH-based CSI transmission structures suggested in LTE release 8 and release 10, the entire CSI transmission structures may be broadly classified into two cases illustrated in FIG. 8 except the case in which the 1st PMI is transmitted in independent resources.

Container A includes an RI, PTI, 1st PMI, etc., container B includes a wideband PMI or CQI, and container C may include subband PMI or CQI. The CSI according to such container types (A, B or C) is merely an example, and does not limit the scope of rights of the present invention. In the present invention, suggested is a method for configuring the number of extended containers and the maximum payload size of the extended containers for the multiple CSI transmission structure, and combining the extended containers with containers within several single CSI transmission structures.

Figure 9:
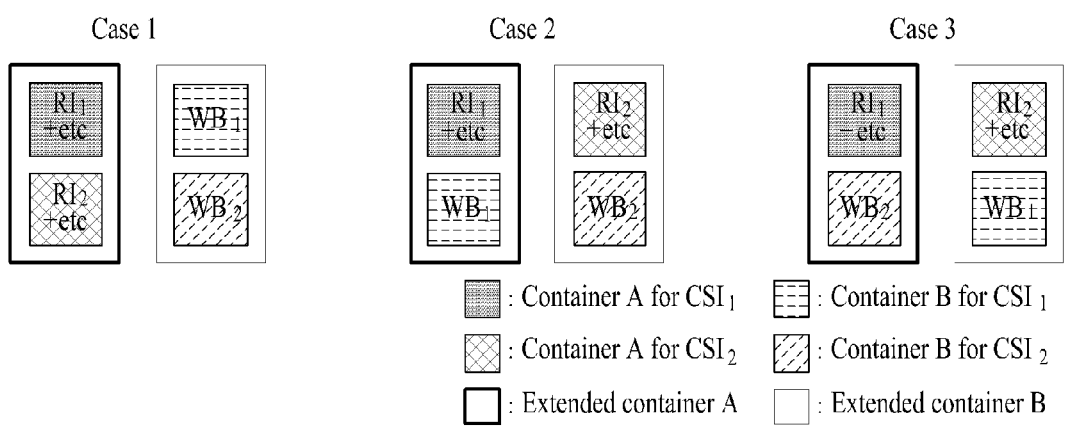
FIG. 9 is a diagram showing an example of a multiple CSI transmission structure which has combined a single CSI transmission structure.

It is assumed that a multiple CSI transmission structure is formed by combining the same two single CSI transmission structures corresponding to $Type_1$ defined in FIG. 8. Here, if it is assumed that the number of the extended containers is two (2), and only 2 containers may be combined with each extended container maximally in consideration of the payload, possible CSI combinations are shown in FIG. 9.

As another example, when a multiple transmission structure is made by combining the same CSI transmission structure corresponding to $Type_2$ defined in FIG. 8, it is assumed that respectively two kinds of containers may be combined in three extended containers. Here, the types of extended containers, which may be generated, are shown in FIG. 10.

Figure 10:
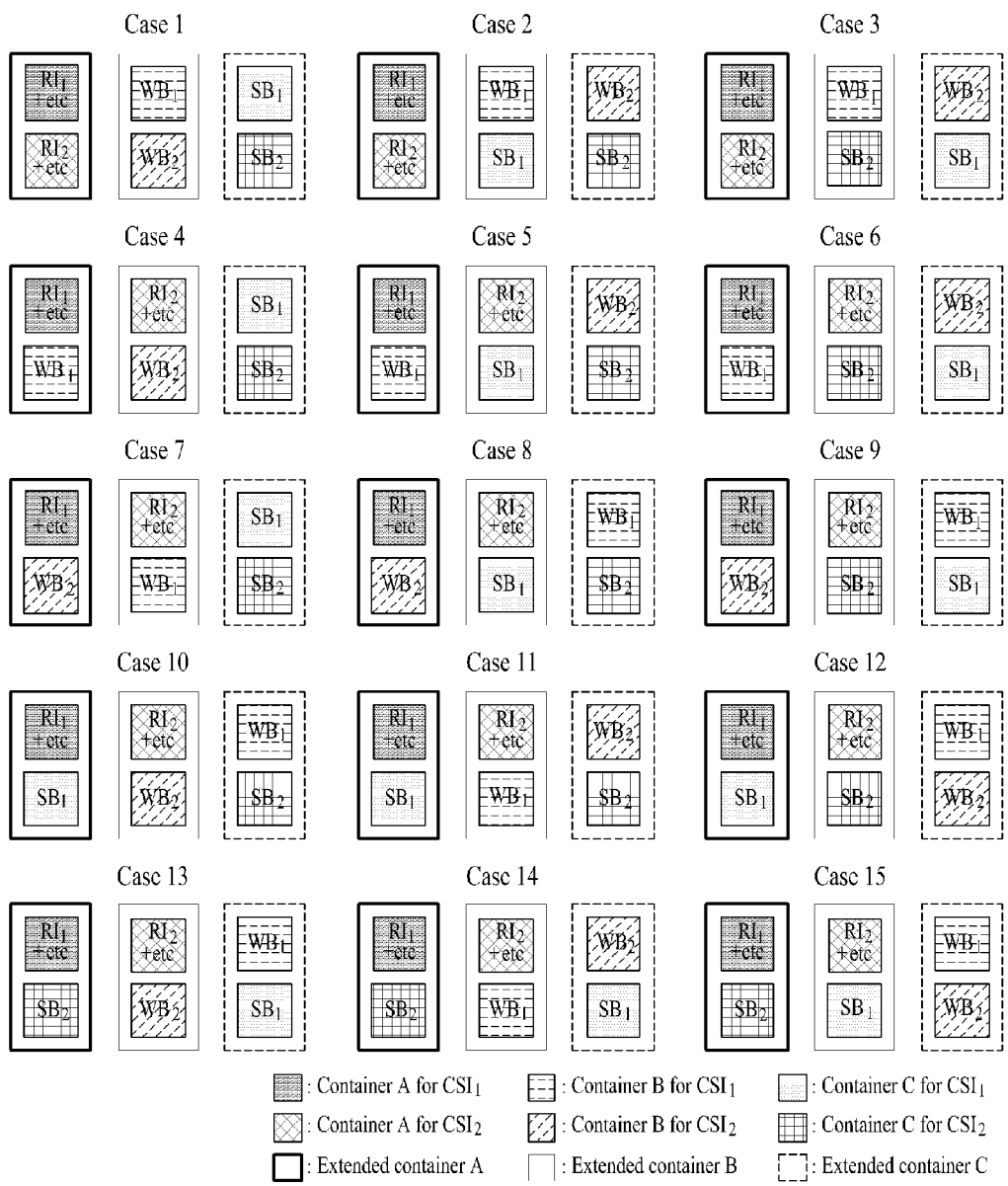
FIG. 10 is a diagram showing an example of a multiple CSI transmission structure which has combined a single CSI transmission structure.

Additionally, when two different CSI transmission structures corresponding to $Type_1$ and $Type_2$ defined in FIG. 8 are combined, three extended containers for respectively containing maximum two containers are assumed as shown in FIG. 10, possible extended container types may be expressed in a form that excludes the sub-band CSI-related container C (i.e., $SB_1$ at each case) from one side CSI transmission structure. Hereinafter, for the convenience of explanation, the operation of the present invention will be described for a few extended container types on the basis of the transmission period.

Figure 11:
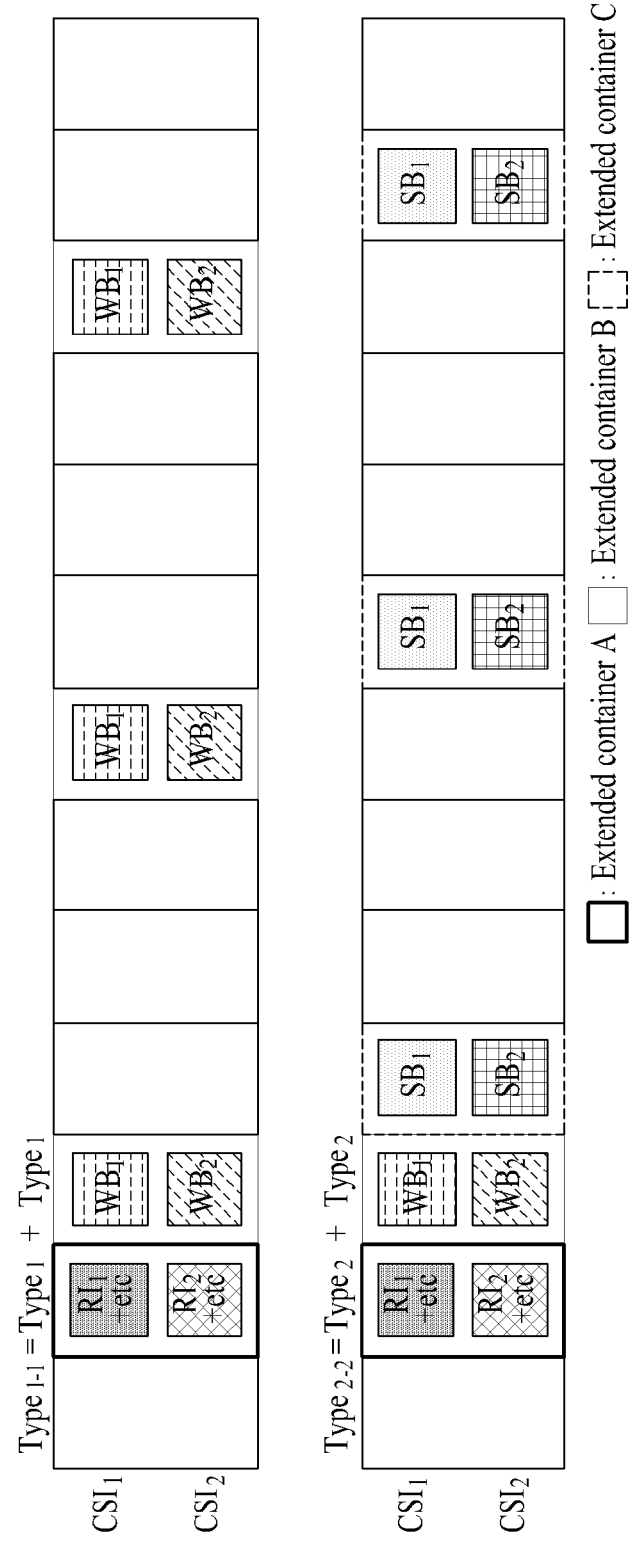
FIG. 11 is a diagram showing an example of a multiple CSI transmission structure by a combination between CSI transmission structures illustrated in FIG. 8.

FIG. 11 illustrates a multiple CSI transmission structure which is applicable in the case in which CSI transmission structures of $Type_1$ are combined or CSI transmission structures of $Type_2$ are combined, and here $CSI_1$ and $CSI_2$ refer to channel information for $TP_1$ and $TP_2$, respectively.

Figure 12:
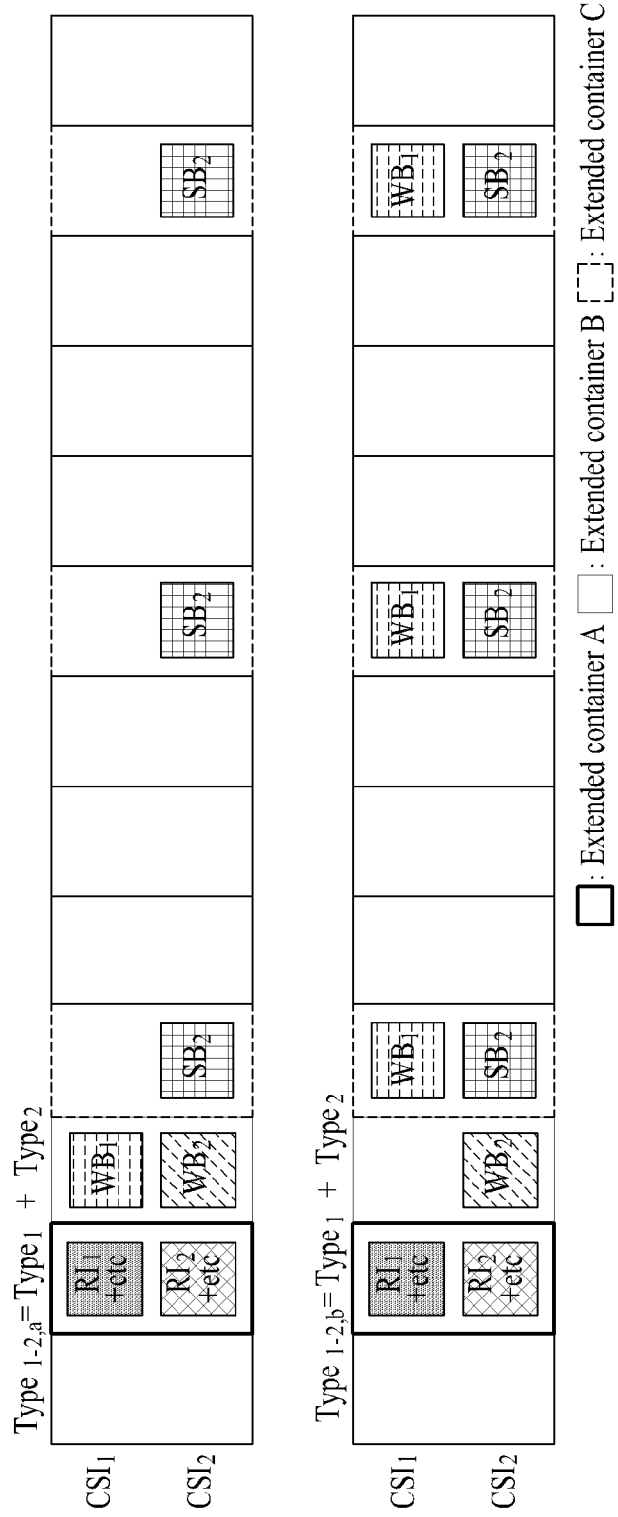
FIG. 12 is a diagram showing an example of a multiple CSI transmission structure by a combination between CSI transmission structures illustrated in FIG. 8.

FIG. 12 shows a multiple CSI transmission structure which is applicable in the case in which the CSI transmission structure of $Type_1$ is combined with the CSI transmission structure of $Type_2$. The case, in which different CSI transmission structures are combined, may be considered in terms of $Type_1$ and $Type_2$. Here, extended container A follows a form in which several container As are combined as shown in FIG. 11. Further, in consideration of transmission period, extended container B may include container Bs of both $Type_1$ and $Type_2$ or only container B of $Type_2$. Here, in the former case, the extended container C includes only container C of $Type_2$, and in the latter case, the extended container C includes both container C of $Type_1$ and container C of $Type_2$.

Figure 13:
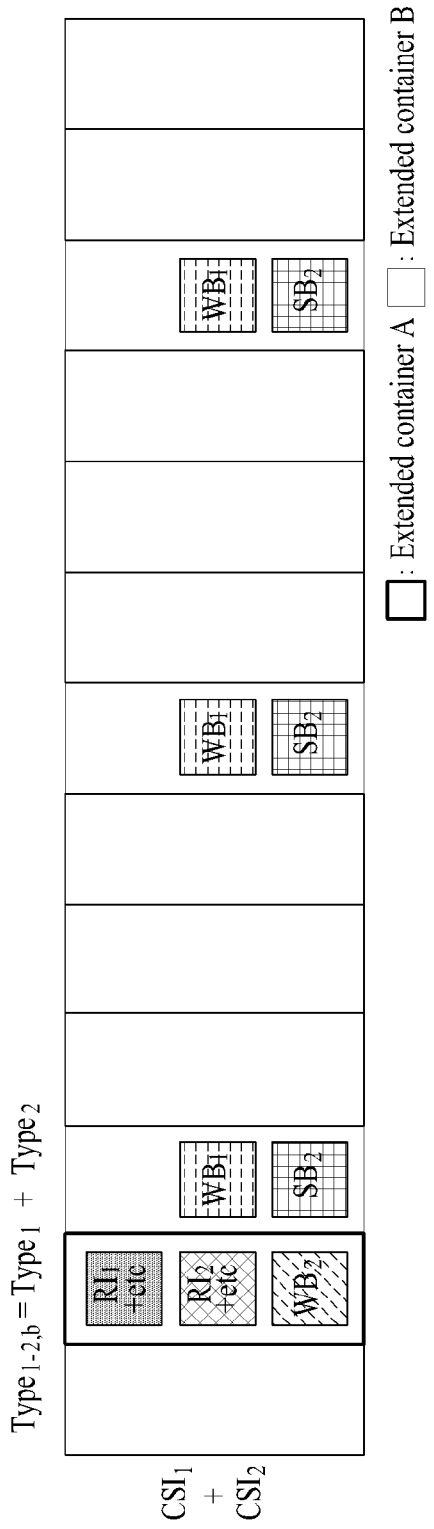
FIG. 13 is a diagram showing a modified example of a multiple CSI transmission structure illustrated in FIG. 12.

If the extended container may contain three containers maximally in FIG. 12, a multiple CSI transmission structure may be constituted by setting two extended containers. For example, in $Type_{1-2,\ b}$ of the above example, the wideband CSI for $CSI_2$ is not transmitted in a separate extended container, and may be transmitted in extended container A where the RI is transmitted. Specifically, the multiple CSI transmission structure may be supported with a total of two extended containers by allocating the RI of $CSI_1$, the RI of $CSI_2$, and the wideband CSI to one extended container, and allocating the wideband CSI of $CSI_1$ and the subband CSI of $CSI_2$ to another extended container. FIG. 13 illustrates this example.

Figure 14:
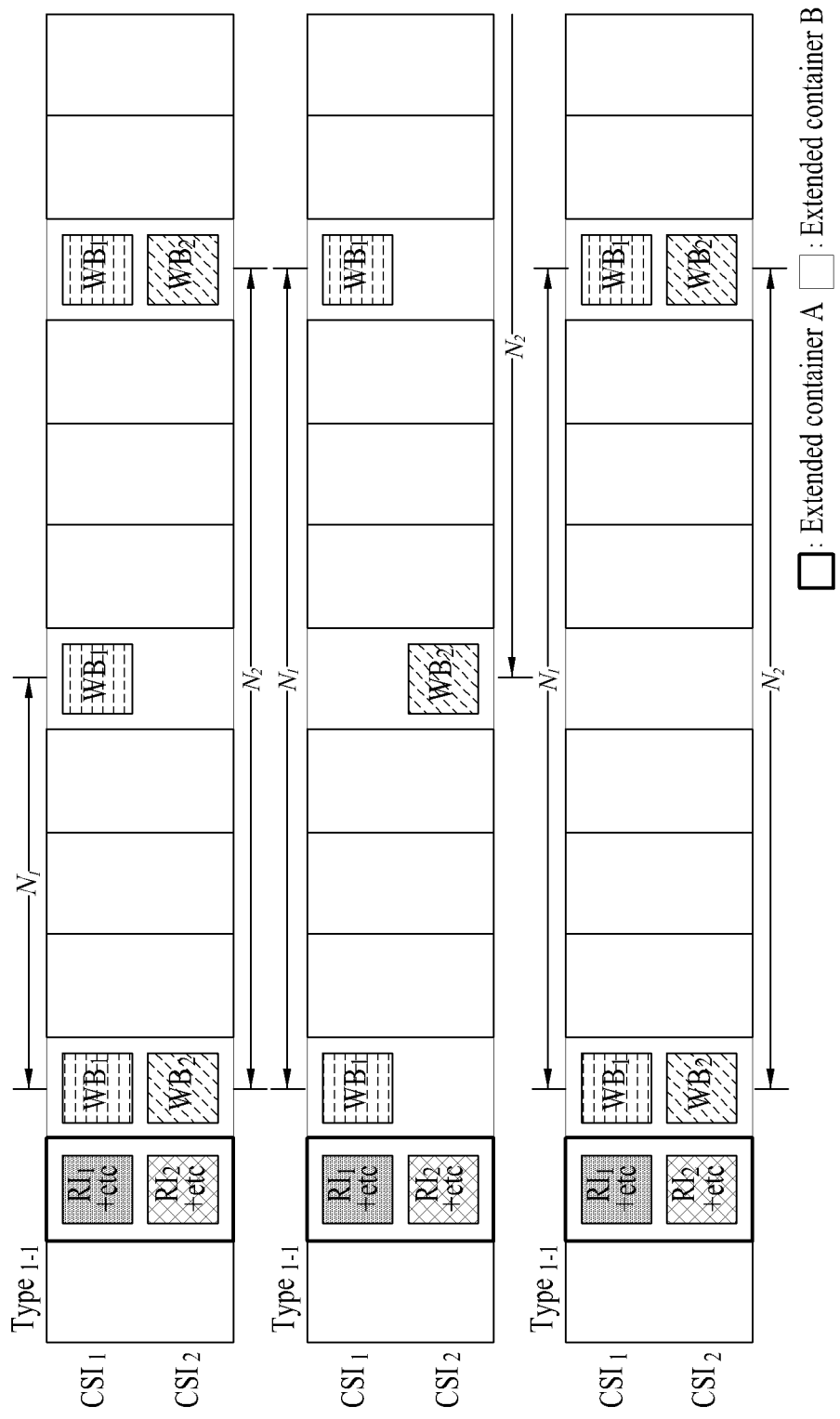
FIG. 14 is a diagram showing an example of adjusting a transmission cycle of an individual CSI in a multiple CSI transmission structure.

FIG. 14 illustrates an example of adjusting a transmission period of an individual CSI in a multiple CSI transmission structure. When a plurality of CSI transmission structures are combined, the transmission period, which is appropriate for each CSI transmission structure, may be different, or a case, in which the period should be adjusted according to a need, may occur. In the present invention, an offset of the transmission time point (or transmission start time point) and the transmission period for an individual CSI within the extended container of the multiple CSI transmission structure are configured to be adjustable in consideration of the above environment. Preferably, the transmission period may be adjusted within a range in which the cycle is a multiple of a predetermined unit transmission period.

For example, when considering a multiple CSI transmission structure in which the same two single CSI transmission structures are combined from the perspective of $Type_1$ defined in FIG. 8, the transmission start time point of $CSI_1$ and $CSI_2$ may be set, and/or the period ($N_1$, $N_2$) for each of $CSI_1$ and $CSI_2$ may be set. The suggested method is applicable with the same principle even in the case in which different CSI transmission structures are combined (e.g., $Type_{1-2}$).

In another exemplary embodiment of the present invention, the offset of transmission time point and the transmission period for each extended container are set to be adjustable by extending a scheme for adjusting the offset of transmission time point and the transmission period for each container (i.e., for each CSI) in the existing single CSI transmission structure. Here, the transmission period for each of the extended containers may be determined as a multiple of a predetermined unit transmission period, or may be set to be shorter or longer than the unit transmission period.

Further, in order to allocate resources for each of the extended containers, a basic offset of the transmission time point is allowed to be set by the upper layer signal, and if at least two extended containers are allocated to time-frequency resources and collide each other, the extended container with a higher priority may be transmitted among predefined extended containers, or extended containers of a new form, which have a recombination of single CSIs, may be transmitted by recombining several single CSIs contained in the predefined extended containers which collide each other.

A method of setting the priority for the CSI transmission when a plurality of CSI transmission structures is simultaneously applied will be described below. As an example of an extended container in an LTE system according to another exemplary embodiment of the present invention, PUCCH format 3 suggested in LTE release 10 may be considered, but a situation, in which multiple CSIs required in the CoMP scheme cannot be contained PUCCH format 3, may occur. In such a situation, there is a need for operating a new CSI transmission structure separately from the multiple CSI transmission structure. The new CSI transmission structure may be the existing CSI transmission structure for a single TP, or may be a separate multiple CSI transmission structure. In the present invention, when the independent CSI transmission structure is simultaneously applied, a CSI preferred at the time of a collision of resources with each other may be protected by giving the priority. At this time, the priority may be given in the unit of the CSI transmission structure, or may be given for each CSI. Further, the priority may be given according to the types of the extended containers (A, B or C).

Figure 15:
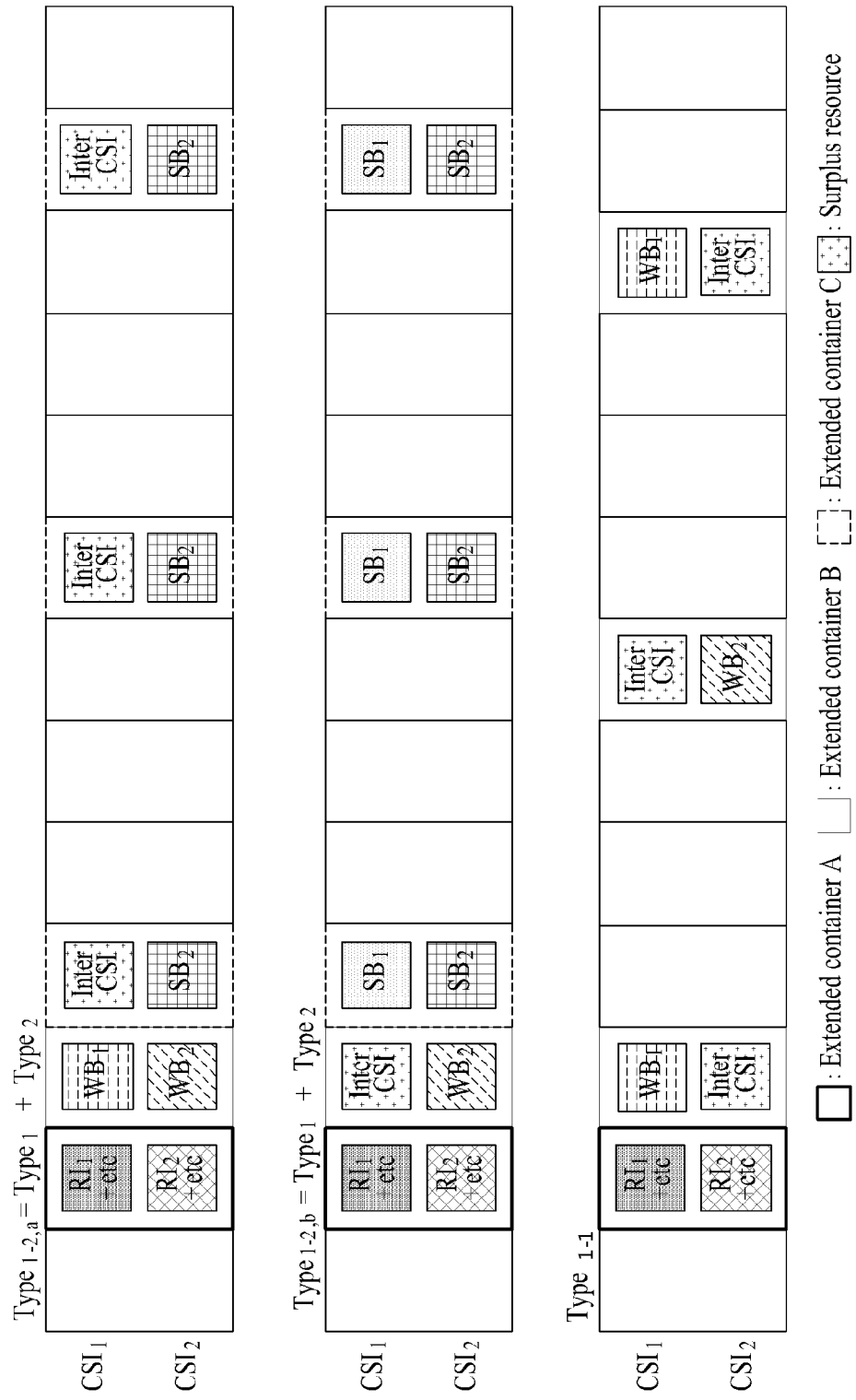
FIG. 15 is a diagram showing an example of utilizing surplus resources which may be generated when forming a multiple CSI transmission structure.

FIG. 15 illustrates a method for utilizing surplus resources, which are generated in forming the multiple CSI structure, as resources for transmitting additional information which is appropriate for the CoMP scheme. Here, the surplus resources mean empty resources, which are not allocated any CSIs, within the extended container when the extended container is considered as the time-frequency resources, and in another expression, the surplus resources may also mean resources which can include a container which is additionally allocated within the extended container.

When transmitting a combined CSI in the extended container, surplus resources may be generated within the extended container depending on the situation. For example, in the case in which different CSI transmission structures of $Type_1$ and $Type_2$ defined in FIG. 8 are combined, surplus resources may be generated inside the extended container at a specific transmission time point as shown in FIG. 12 (extended container C in $Type_{1-2,a}$, and extended container B in $Type_{1-2,b}$). The surplus resources may also be generated in the case in which each CSI transmission period may be adjusted for the combined CSI as shown in FIG. 14 (extended container B of $Type_{1-1}$).

According to another exemplary embodiment of the present invention, a method for utilizing the surplus resources as resources for transmitting additional information, which is appropriate for the CoMP scheme, is suggested. For example, if it is assumed that the joint transmission (JT) scheme has been applied, inter point CSIs such as a phase difference or a channel size difference between TPs, which participate in the JP scheme, may be required to enhance performance of the CoMP scheme, and the inter point CSIs may be transmitted through the surplus resources. Here, the inter point CSI may be determined based on CSIs which are available at the transmission time point.

As another application, in order to support the coordinated scheduling (CS) or coordinate beamforming (CB) scheme, information on whether resources may be emptied at a specific band or coordinated beamforming may be supported may transmitted through surplus resources, or in order to support a dynamic point selection (DPS), information on from which TP each CSI is transmitted may be transmitted through surplus resources. However, additional information does not necessarily need to be transmitted in the surplus resources, and if there is no information to be transmitted to the surplus resources, the payload of the extended container may be set to be small while the transmission power may be increased.

According to the exemplary embodiment shown in FIG. 15, additional information as well as CSI may be transmitted through surplus resources which may be generated when forming a multiple CSI transmission structure.

Figure 16:
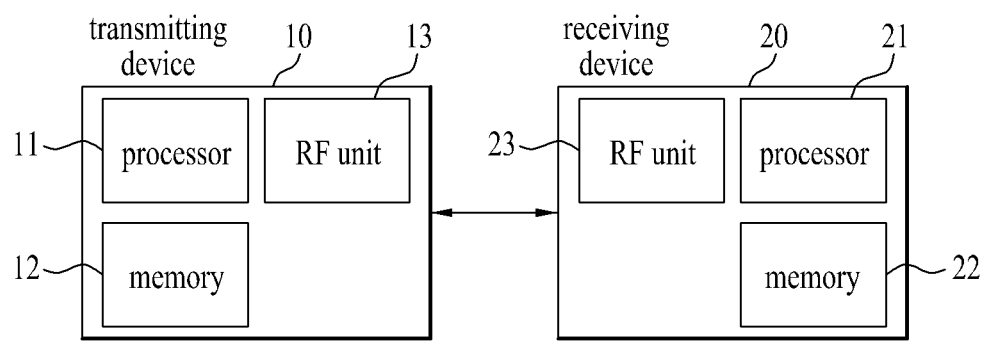
FIG. 16 is a block diagram showing a transmitting device and a receiving device which are configured to perform the exemplary embodiments of the present invention.

FIG. 16 is a block diagram illustrating components of a transmitting device 10 and a receiving device 20 which perform the present invention.

The transmitting device 10 and the receiving device 20 include a radio frequency (RF) unit 13 and 23 for transmitting or receiving radio signals which carry information and/or data, a signal, a message, etc., a memory 12 and 22 for storing various sets of information related with communication within a wireless communication system, and a processor 11 and 21 which is functionally connected to the components such as the RF unit 13 and 23 and the memory 12 and 22, and is configured to control the memory 12 and 22 and/or the RF unit 13 and 23 so that the device performs at least one of the exemplary embodiments of the present invention.

The memory 12 and 22 may include a program for processing and control of the processor 11 and 21, and may temporarily store input/output information. The memory 12 and 22 may also be utilized as a buffer.

The processor 11 and 21 generally controls overall operation of various modules within the transmitting device or the receiving device. In particular, the processor 11 and 21 may perform various control functions for performing the present invention. The processor 11 and 21 may also be called a controller, a microcontroller, a microprocessor, a microcomputer, etc. The processor 11 and 21 may be implemented by hardware, firmware, software and a combination thereof. In the case in which the present invention is implemented by hardware, application specific integrated circuits (ASICs), digital signal processors (DSPs), digital signal processing devices (DSPDs), programmable logic devices (PLDs), field programmable gate arrays (FPGAs), etc., which are configured to perform the present invention, may be included in the processor 11 and 21. Further, in the case in which the present invention is implemented using firmware or software, the firmware or software may be configured to include modules, procedures, functions, etc. for performing functions and operations of the present invention, the firmware or software, which is configured to perform the present invention, may be included in the processor 11 and 21, or may be stored in the memory 12 and 22 and operated by the processor 11 and 21.

The processor 11 of the transmitting device 10 codes and modulates a signal, which is scheduled from the processor 11 or a scheduler connected to the processor 11, and is to be transmitted to the outside, and transmits the coded and modulated signal to the RF unit 13. For example, the processor 11 converts a data array to be transmitted into K layers by de-multiplexing, channel-coding, scrambling, and modulating the data array. The coded data array may also be called a codeword, and is an equivalent of a transmission block which is a data block provided by a medium access control (MAC) layer. One transport block (TB) is coded as one codeword, and each codeword is transmitted to the receiving device in the form of one or more layers. The RF unit 13 may include an oscillator for frequency up conversion. The RF unit 13 may include Nt transmission antennas (Nt is a positive integer).

The signal processing process of the receiving device 20 is constituted in a manner that is opposite to the signal processing process of the transmitting device 10. Under the control of the processor 21, the RF unit 23 of the receiving device 20 receives radio signals transmitted by the transmitting device 10. The RF unit 23 may include Nr receiving antennas (here, Nr is a positive integer), and the RF unit 23 frequency-down-converts each of the signals received through the receiving antennas, thereby restoring the signals as baseband signals. The RF unit 23 may include an oscillator for frequency down conversion. The processor 21 may restore data, which was intended to be transmitted by the transmitting device 10, by decoding and demodulating radio signals received through the receiving antenna.

According to an exemplary embodiment of the present invention, the RF unit 13 and 23 includes at least one antenna. The antenna may transmit a signal processed by the RF unit 13 and 23 to the outside or may receive a radio signal from the outside and transmit the received signal to the RF unit 13 and 23. The antenna is also call an antenna port. Each antenna may correspond to one physical antenna, or may be constituted by a combination of one or more physical antenna elements. The signal transmitted from each antenna may not be further decomposed by the receiving device 20. Reference signals (RS) transmitted in response to the antenna define an antenna viewed from the perspective of the receiving device 20, and allows the receiving device 20 to perform channel estimation on the antenna regardless of whether the channel is a signal radio channel from one physical antenna or is a composite channel from a plurality of physical antenna elements. That is, the antenna is defined so that the channel, on which the symbol on the antenna is transmitted, may be drawn from the channel on which another symbol of the same antenna is transmitted. The RF unit, which supports a multi-input multi-output (MIMO) function that transmits and receives data using multiple antennas, may be connected to two or more antennas.

In the exemplary embodiments of the present invention, the UE or relay is operated as a transmitting device 10 in uplink and as a receiving device 20 in downlink. In the exemplary embodiments of the present invention, the BS is operated as a receiving device 20 in uplink and as a transmitting device 10 in downlink.

Hereinafter, a processor, a memory and a RF unit, which are included in the base station (BS), are called a BS processor, a BS memory and a BS RF unit, respectively. Further, a processor, a memory and a RF unit, which are included in the UE, are called a UE processor, a UE memory and a UE RF unit, respectively. In the present invention, the BS processor may be a processor located in the BS, or may be a BS controller which is connected to the BSE through a cable or a dedicated line and is configured to control the BS.

Hereinafter, the invention will be described on the basis of the downlink, and thus the transmitting device 10 corresponds to the BS and the receiving device 20 corresponds to the UE. The receiving device 20 may correspond to the UE configured to transmit channel state information in a wireless communication system. The receiving device 20 may include a radio frequency (RF) unit 23 configured to transmit or receive radio signals and a processor 21 configured to control the RF unit. Further, the receiving device 20 may include a memory 22 configured to store a series of data including information needed for performing communication with the BS.

The UE processor 21 may control the UE RF unit 23 to receive control information about a transmission of the CSI from a serving eNodeB (base station). The UE processor may be configured to allocate the CSI combination comprised of different CSIs to one subframe on the basis of the received control information. Further, the UE processor may control the UE RF unit to transmit the CSI combination in the allocated subframe to the serving eNodeB. Here, the control information may include information on a maximum payload size of a CSI being able to be transmitted in one subframe, the transmission period and the transmission start point of the CSI combination or each of the different CSIs. As such, the UE processor may adjust the transmission period and the transmission start point of the CSI combination, or adjust the transmission period and the transmission start point of each of the different CSIs when allocating the CSIs or the CSI combination to the subframe. Here, the CSI combination may be comprised of at least two different CSIs.

Further, the transmission period of the CSI combination or each of the different CSIs may be set to a multiple of a predetermined unit transmission period. In the case in which the CSI may be additionally allocated to the subframe to which the CSI combination has been allocated, the UE processor may be configured to additionally allocate the additional CSI to the subframe. Here, the additional CSI may include CSI between base stations which perform downlink transmission to the UE (that is, inter point CSI).

The UE processor may be configured to allocate the combination of different types of CSIs to one subframe. In other words, at least two sets of information among RI, PMI, $1^{st}$ PMI, wideband PMI/CQI, and subband PMI/CQI may be allocated to one subframe. Further, the CSI for different base stations/TPs may be allocated to one subframe. This means that at least two CSIs may be simultaneously transmitted, and the CSIs for different base stations or TPs may be simultaneously transmitted.

Likewise, the CSI feedback on the CoMP set of the UE may be smoothly performed by configuring a multiple CSI transmission structure. In particular, a more efficient time-frequency resource allocation for the CSI can be performed by adjusting the transmission period and the transmission start time point of the extended container or an individual CSI.

When at least two CSI combinations are allocated to one subframe and collide with each other, the UE processor may be configured to control the UE RF unit to transmit one CSI combination selected from at least two CSI combinations. The selection is determined according to the order or priority, and the priority may be given to each CSI combination or each CSI. The stability of the wireless communication system, to which the present invention is applied, may be secured by making more important CSI information (or CSI information of a high priority) transmitted to the base station in preparation of the collision between CSI combinations.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The exemplary embodiments of the present invention may be utilized in a user equipment, a base station and other devices in a wireless communication system.

What is claimed is:

1. A method for transmitting, by a user equipment (UE), channel state information (CSI) for a plurality of eNodeBs in a wireless communication system where the UE is being served by the plurality of eNodeBs, the method comprising:
receiving control information about a transmission of the CSI from a primary serving eNodeB;
allocating a CSI combination composed of respective CSIs for downlink channels associated with the plurality of eNodeBs including the primary serving eNodeB to a multiple CSI transmission format based on the received control information, wherein the multiple CSI transmission format is a combined form of two or more CSI transmission formats according to a PUCCH (Physical Uplink Control CHannel)-based transmission mode; and
transmitting the CSI combination to the serving eNodeB using the multiple CSI transmission format,
wherein the control information includes information on a maximum payload size of a CSI combination being able to be transmitted in a uplink subframe, a transmission period and a transmission start time point of the CSI combination, and a transmission period and a transmission start time point of each of the respective CSIs.

2. The method according to claim 1, wherein the transmission period of the CSI combination or each of the respective CSIs is set to a multiple of a predetermined unit transmission period.

3. The method according to claim 1, wherein the method further comprises:
if there is extra resource for additional respective CSI in the multiple CSI transmission format, allocating inter-eNodeB CSI to the extra resource.

4. The method according to claim 1, wherein the CSI combination comprises at least two different kinds of CSIs.

5. The method according to claim 1, wherein, when at least two CSI combinations are allocated to the one subframe and collide with each other, the transmitting includes transmitting one CSI combination selected from the at least two CSI combinations.

6. The method according to claim 5, wherein the selection is determined according to a priority and the priority is given to each of the CSI combinations or each of the different CSIs in the CSI combinations.

7. A user equipment (UE) for transmitting channel state information (CSI) for a plurality of eNodeBs in a wireless communication system where the UE is being served by the plurality of eNodeBs, the UE comprising:
a radio frequency (RF) unit for transmitting or receiving a radio signal; and
a processor for controlling the RF unit,
wherein the processor is configured to control the RF unit to receive control information about a transmission of the CSI from a primary serving eNodeB, allocate a CSI combination composed of respective CSIs for downlink channels associated with the plurality of eNodeBs including the primary serving eNodeB to a multiple CSI transmission format for transmitting based on the received control information, wherein the multiple CSI transmission format is a combined form of two or more CSI transmission formats according to a PUCCH (Physical Uplink Control CHannel)-based transmission mode, and controls the RF unit to transmit the CSI combination to the serving eNodeB using the multiple CSI transmission format,
wherein the control information includes information on a maximum payload size of a CSI combination being able to be transmitted in a uplink subframe, a transmission period and a transmission start time point of the CSI combination, and a transmission period and a transmission start time point of each of the respective CSIs.

8. The UE according to claim 7, wherein the transmission period of the CSI combination or each of the respective CSIs is set to a multiple of a predetermined unit transmission period.

9. The UE according to claim 7, wherein the processor is further configured to: if there is extra resource for additional respective CSI in the multiple CSI transmission format, allocate inter-eNodeB-CSI to the extra resource.

10. The UE according to claim 7, wherein the CSI combination comprises at least two different kinds of CSIs.

11. The UE according to claim 7, wherein, when at least two CSI combinations are allocated the one subframe and collide with each other, the processor controls the RF unit to transmit one CSI combination selected from the at least two CSI combinations.

12. The UE according to claim 11, wherein the selection is determined according to a priority, and the priority is given to each of the CSI combinations or each of the different CSIs in the CSI combinations.

13. A method for receiving, by an eNodeB, a channel state information (CSI) in a wireless communication system, the method comprising:
transmitting control information on transmission of the CSI to a user equipment (UE); and
receiving, from the UE, a CSI combination in a multiple CSI transmission format to which the CSI combination has been allocated based on the control information, wherein the multiple CSI transmission format is configured for transmitting a CSI combination composed of respective CSIs for downlink channels associated with a plurality of eNodeBs including the eNodeB and is a combined form of two or more of CSI transmission formats according to a PUCCH (Physical Uplink Control CHannel)-based transmission mode,
wherein the control information includes information on a maximum payload size of a CSI being able to be transmitted in one subframe, a transmission period and a transmission start time point of the CSI combination, and a transmission period and a transmission start time point of each of the different CSIs.

14. The method according to claim 13, wherein the transmission period of the CSI combination or each of the respective CSIs is set to a multiple of a predetermined unit transmission period.

15. The method according to claim 13, wherein the CSI combination comprises at least two different kinds of CSIs.

16. An eNodeB for receiving a channel state information (CSI) in a wireless communication system, the eNodeB comprising:

a radio frequency unit for transmitting and receiving a radio signal; and a processor for controlling the RF unit, wherein the processor is configured to control the RF unit to transmit control information on transmission of the CSI to a user equipment (UE) and to receive the CSI combination, from the UE, in a multiple CSI transmission format to which the CSI combination has been allocated based on the control information, wherein the multiple CSI transmission format is configured for transmitting a CSI combination composed of respective CSIs for downlink channels associated with a plurality of eNodeBs including the eNodeB and is a combined form of two or more CSI transmission formats according to a PUCCH (Physical Uplink Control CHannel)-based transmission mode, and wherein the control information includes information on a maximum payload size of a CSI being able to be transmitted in one subframe, a transmission period and a transmission start time point of the CSI combination, and a transmission period and a transmission start time point of each of the different CSIs.

17. The eNodeB according to claim 16, wherein the transmission period of the CSI combination or each of the respective CSIs is set to a multiple of a predetermined unit transmission period.

18. The eNodeB according to claim 16, wherein the CSI combination comprises at least two different kinds of CSIs.

* * * * *